United States Patent
Gangi

[19]

[11] Patent Number: 6,131,811
[45] Date of Patent: Oct. 17, 2000

[54] WALLET CONSOLIDATOR

[75] Inventor: Frank J. Gangi, Frisco, Tex.

[73] Assignee: E-Micro Corporation, Frisco, Tex.

[21] Appl. No.: 09/087,193

[22] Filed: May 29, 1998

[51] Int. Cl.[7] ........................................... G06K 5/00
[52] U.S. Cl. ............................. 235/380; 235/492
[58] Field of Search .................... 235/379, 380, 235/492

[56] References Cited

U.S. PATENT DOCUMENTS

| | | |
|---|---|---|
| 4,701,601 | 10/1987 | Francini et al. . |
| 4,705,211 | 11/1987 | Honda et al. . |
| 4,837,422 | 6/1989 | Dethloff et al. . |
| 4,868,376 | 9/1989 | Lessin et al. . |
| 5,095,196 | 3/1992 | Miyata . |
| 5,135,095 | 8/1992 | Kocznar et al. . |
| 5,276,311 | 1/1994 | Hennige . |
| 5,585,787 | 12/1996 | Wallerstein . |
| 5,895,903 | 4/1999 | Abe et al. ................................ 235/379 |

FOREIGN PATENT DOCUMENTS

| | | |
|---|---|---|
| 0656600 | 6/1995 | European Pat. Off. . |
| 98/10363 | 3/1998 | WIPO . |
| 98/12675 | 3/1998 | WIPO . |

OTHER PUBLICATIONS

Towitoko Electronics, "Product Overview Smartcard Terminals & Systems", Feb., 1998.
Dr. Klaus Vedder and Dr. Franz Weikmann, Giesecke & Devrient, "Smart Cards—Requirements, Properties and Applications", 1998.
"ActivCard", ActivCard, Inc., 1998.
OKI Advanced Products, OKI America, Inc., "Value–Checker™ CP", 1998.
Logis Chipcard Products, "Logismart Chipcard Readers—Worth Your Attention", 1998.
Setec Oy, "Setpurse™", 1998.
NURI Information & Communication Inc., "NURI Smart Card Solutions", 1998.

Primary Examiner—Harold I. Pitts
Attorney, Agent, or Firm—Jenkens & Gilchrist

[57] ABSTRACT

A method and apparatus for warehousing information in a wallet consolidator. The wallet consolidator includes a controller for controlling operation of the wallet consolidator, a magnetic stripe reader/writer for reading and writing magnetic stripes, a bar code scanner for scanning bar codes, a keypad for inputting user selections and commands, a memory for storing information provided to the wallet consolidator, a smart card interface for effectuating communication between the wallet consolidator and a smart card and a display screen for displaying text and graphics, the display screen further for displaying a bar code pattern capable of being scanned by a bar code reader. To store information in the wallet consolidator, or alternatively in a smart card interfaced to the wallet consolidator, information is read from magnetic stripes on various types of cards such as, but not limited to, credit, debit and identification cards. Additionally, images of the cards including, but not limited to, signatures and portraits are downloaded and stored. A user retrieves the information from any of the stored magnetic stripes and writes the information to a single magnetic stripe for use in a point of sale transaction. Similarly, stored images are retrieved and displayed on a display screen including a bar code which can be scanned by a bar code scanner.

19 Claims, 3 Drawing Sheets

WALLET CONSOLIDATOR

FIELD OF THE INVENTION

The present invention pertains in general to the use of electronic smart cards for the storage of information pertaining to electronic commerce and consumer identification, and in particular, but not by way of limitation, to a method and apparatus for the warehousing and retrieval of information pertaining to credit cards, debit cards, identification cards and other selected data.

BACKGROUND OF THE INVENTION

In today's electronic commerce there has been a proliferation in the use of various types of credit, debit, identification and other types of authorization cards. For example, an average individual is likely to carry a driver's licence, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Attempts have been made to use a single smart card to hold the various information contained on several cards. These attempts, however, involve the downloading of information from the smart card provider and do not allow a smart card user to control the contents of the device by adding additional information from newly issued cards or removing information from discontinued cards.

It would be advantageous, therefore, to devise a method and apparatus for consolidating the various cards, and other types of information, which individuals typically carry in a wallet or purse. It would further be advantageous if such a method and apparatus stored the information in a central location and facilitated the use of a single multi-purpose card. It would still further be advantageous if such a method and apparatus allowed the user of the method and apparatus the ability to control the stored information.

SUMMARY OF THE INVENTION

The present invention comprises a method and apparatus for warehousing information in a wallet consolidator. The wallet consolidator includes a controller for controlling operation of the wallet consolidator, a magnetic stripe reader/writer for reading and writing magnetic stripes, a bar code scanner for scanning bar codes, a keypad for inputting user selections and commands, a memory for storing information provided to the wallet consolidator, a smart card interface for effectuating communication between the wallet consolidator and a smart card and a display screen for displaying text and graphics, the display screen further for displaying a bar code pattern capable of being scanned by a bar code scanner.

To store information in the wallet consolidator, or alternatively in a smart card interfaced to the wallet consolidator, information is read from magnetic stripes on various types of cards such as, but not limited to, credit, debit and identification cards. A bar code scanner allows a bar code to be scanned from a card and stored in memory. Additionally, images of the cards including, but not limited to, signatures, portraits can be downloaded, and with sufficient memory, stored for future use. A user retrieves information from any of the stored magnetic stripes and writes the information to a single magnetic stripe for use in a point of sale transaction. Similarly, stored images are retrieved and displayed on a display screen including a bar code which can be scanned by a bar code scanner.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

Figure 1:
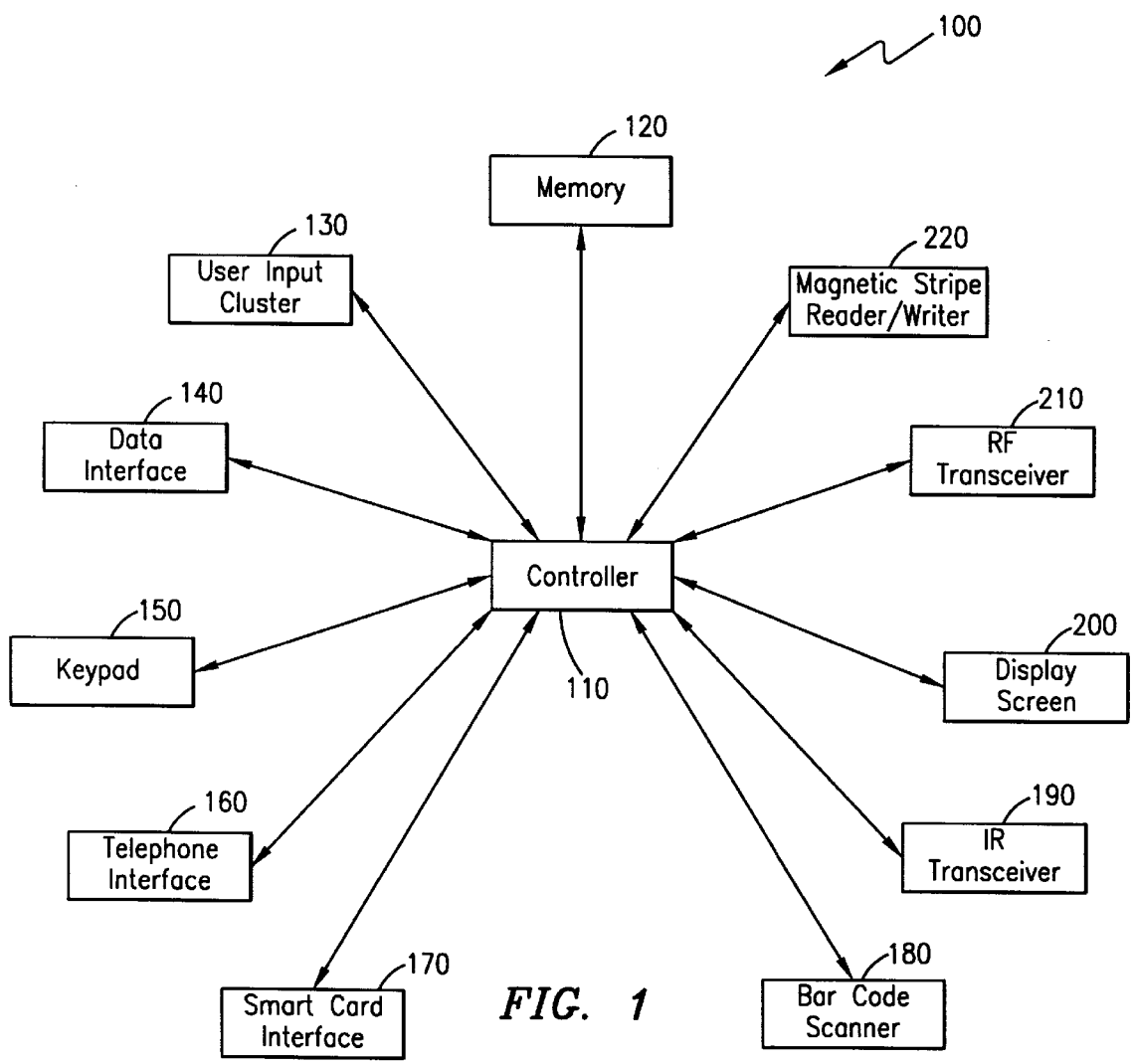
FIG. 1 is a functional block diagram of the wallet consolidator.

Referring now to FIG. 1, there is illustrated a functional block diagram of a wallet consolidator shown generally at 100. The functional components of the wallet consolidator 100 include a controller 110, a memory 120, a user input cluster 130, a data interface 140, a keypad 150, a telephone interface 160, a smart card interface 170, a bar code scanner 180, an infrared transceiver 190, a display screen 200, a radio frequency transceiver 210 and a magnetic stripe reader/writer 220.

The controller 110, controls the overall operation of the wallet consolidator 100 including the coordination of the various functional blocks. The magnetic stripe reader/writer 220 is used to read and write information from and to magnetic stripes used on credit cards, debit cards and identification cards among others. Information read from the magnetic stripes by the magnetic stripe reader/writer 220 is stored in the memory 120 of the wallet consolidator 100. In an alternative embodiment, the information is stored in a memory located within a smart card which is commonly known in the industry. In situations where the information from the magnetic stripe is stored in the memory of the smart card, the information is written into the memory of the smart card using the smart card interface 170. The smart card interface 170 effectuates reading and writing from and to the smart card.

A keypad 160, is used as a user input for inputting information or indicating selections and actions to the wallet consolidator 100. In the preferred embodiment of the present invention, the keypad 160 is a numeric keypad, however; in an alternative embodiment the keypad 160 is an alphanumeric keypad. The user cluster 130 provides an additional user input for communicating selections and actions to the wallet consolidator 100. While it is understood that the user input cluster 130 can have any number of input buttons, the preferred embodiment of the present invention includes an up and a down button for moving through options provided to the user on the display screen 200, a delete button for removing items from the display screen and an activate button for making a selection and/or enabling an action by the wallet consolidator 100.

The bar code scanner 180 allows a user to scan a bar code on the face of identification, credit, debit and other types of cards and to store the bar code in the memory 120 of the wallet consolidator, or alternatively, in the memory of the smart card. In either event, the user can select the bar code for display on the display screen 200 such that the bar code, as displayed on the display screen 200, is readable by a bar code scanner.

In addition to displaying items stored in the memory 120 of the wallet consolidator 100, or alternatively the memory of the smart card, the display screen 200 is used for programming and/or otherwise controlling operation of the wallet consolidator 100. For example, the display screen 200, in conjunction with the keypad 150 and/or the user input cluster 130, is used by the user to input a passcode to gain access to the wallet consolidator 100. In an alternative embodiment, the keypad 150 is effectuated using a touch sensitive display screen 200. After gaining access to the wallet consolidator 100, the controller 110 displays a menu of functions on the display screen 200 and the user makes a selection by either using the user input cluster 130 to scroll through and select an option or directly selecting and option using the keypad 150. The types of options include, but are not limited to, selecting a card to add or delete, duplicating information, transferring data, moving cash or accessing various types of information such as electronic coupons, identification information or medical records among others. Based on the selected option, the wallet consolidator 100, via the display screen 200 traverses an action tree which instructs the user on the use of the wallet consolidator 100.

The data interface 140 and telephone interface 160 effectuate communication between the wallet consolidator 100 and various computing devices such as, but not limited to, point of sale terminals, dumb terminals and databases. The data interface 140 uses a serial data port, a parallel data port or any other data communication technique. In a similar fashion, the telephone interface 160 allows communication via a wireline or wireless telecommunication network. Furthermore, the infrared transceiver 190 and the radio frequency transceiver 210 effectuate wireless communication between the wallet consolidator 100 and various computing devices such as, but not limited to, point of sale terminals, dumb terminals and databases, which are equipped with a similar infrared transceiver or radio frequency transceiver.

The wallet consolidator 100 allows an individual to swipe their credit, debit, identification or other type cards through the magnet stripe reader/writer 220 and store the information contained in the magnetic stripe in the memory 120 of the wallet consolidator 100, or alternatively in the memory of the smart card. The wallet consolidator 100 also allows an individual to scan a bar code on a card using the bar code scanner 180 and store the bar code in the wallet consolidator 100, or alternatively in the memory of the smart card. Furthermore, the individual can download the image of the cards, or other cards which do not have a magnetic stripe and, with sufficient memory, store a digitized image in the memory 120 of the wallet consolidator 100, or alternatively in the memory of the smart card. Additionally, other types of information can be stored in either the memory 120 of the wallet consolidator 100 or the memory of the smart card. Among other types of information, items such as electronic coupons or food stamp balances can be stored and then redeemed during a point of sale transaction. Communication with various computing devices such as, but not limited to, point of sale terminals, dumb terminals and databases, can be effectuated using the telephone interface 160, the radio frequency transceiver 210, the infrared transceiver 190 or the display screen 200.

Figure 2:
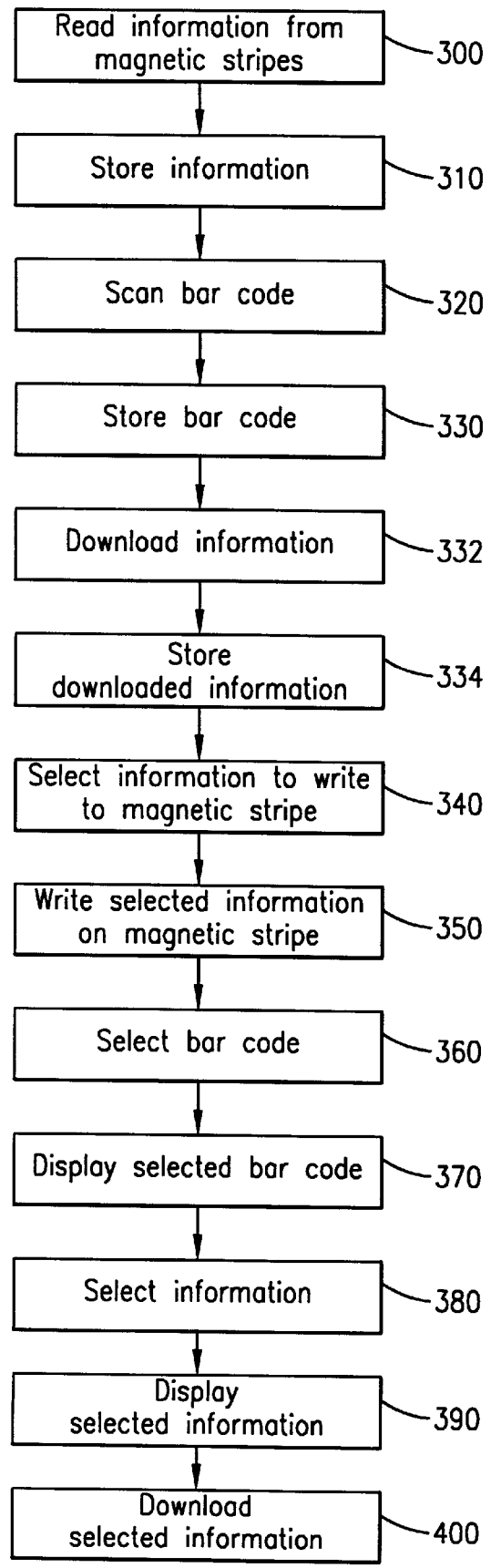
FIG. 2 is a flow diagram of a preferred method for consolidating card information using the wallet consolidator described in FIG. 1.

Referring additionally now to FIG. 2, there is illustrated a flow diagram of a preferred method for consolidating card information using the wallet consolidator 100 described in FIG. 1. Information stored on magnetic stripes is entered into the wallet consolidator 100 by swiping the subject identification, credit, debit or other type of card through the magnetic stripe reader/writer 220 to read the information from the magnetic stripe of the subject card (step 300). Alternatively, the information can be entered into the wallet consolidator 100 via the data interface 140, the keypad 150, the telephone interface 160, the infrared transceiver 190 or the radio frequency transceiver 210. The entered information is stored in the memory 120 of the wallet consolidator 100, or alternatively in the memory of the smart card (step 310).

Similarly, bar codes from the cards are scanned (step 320) and the bar codes are stored in the memory 120 of the wallet consolidator 100, or alternatively, in the memory of the smart card (step 330). Alternatively, the information can be entered into the wallet consolidator 100 via the data interface 140, the keypad 150, the telephone interface 160, the infrared transceiver 190 or the radio frequency transceiver 210.

Still further, other information such as electronic coupons or images such as portraits and signatures, are downloaded into the wallet consolidator 100 (step 332) and stored in the memory 120 of the wallet consolidator 100, or alternatively, in the memory of the smart card (step 334). The information can be downloaded into the wallet consolidator 100 via the data interface 140, the keypad 150, the telephone interface 160, the infrared transceiver 190 or the radio frequency transceiver 210.

To retrieve magnetic stripe information from the wallet consolidator 100, the user selects the desired information using either the user input cluster 130 or the keypad 150 (step 340). Once the information has been selected, the information can be written onto a magnetic strip of the smart card or other multi-use card (step 350). Alternatively, the information which was selected can be communicated to various computing devices such as, but not limited to, point of sale terminals, dumb terminals and databases via the data interface 140, the telephone interface 160, the infrared transceiver 190 or the radio frequency transceiver 210.

Similarly, the user selects a desired bar code using either the user input cluster 130 or the keypad 150 (step 360) and the selected image is displayed on the display screen 200 (step 370). Alternatively, the information which was selected can be communicated to various computing devices such as, but not limited to, point of sale terminals, dumb terminals and databases via the data interface 140, the telephone interface 160, the infrared transceiver 190 or the radio frequency transceiver 210.

Still further, the user can select stored information, including downloaded information, (step 380) and display the selected information (step 390) or download the selected information (step 400) to various computing devices such as, but not limited to, point of sale terminals, dumb terminals and databases via the data interface 140, the telephone interface 160, the infrared transceiver 190 or the radio frequency transceiver 210.

Figure 3:
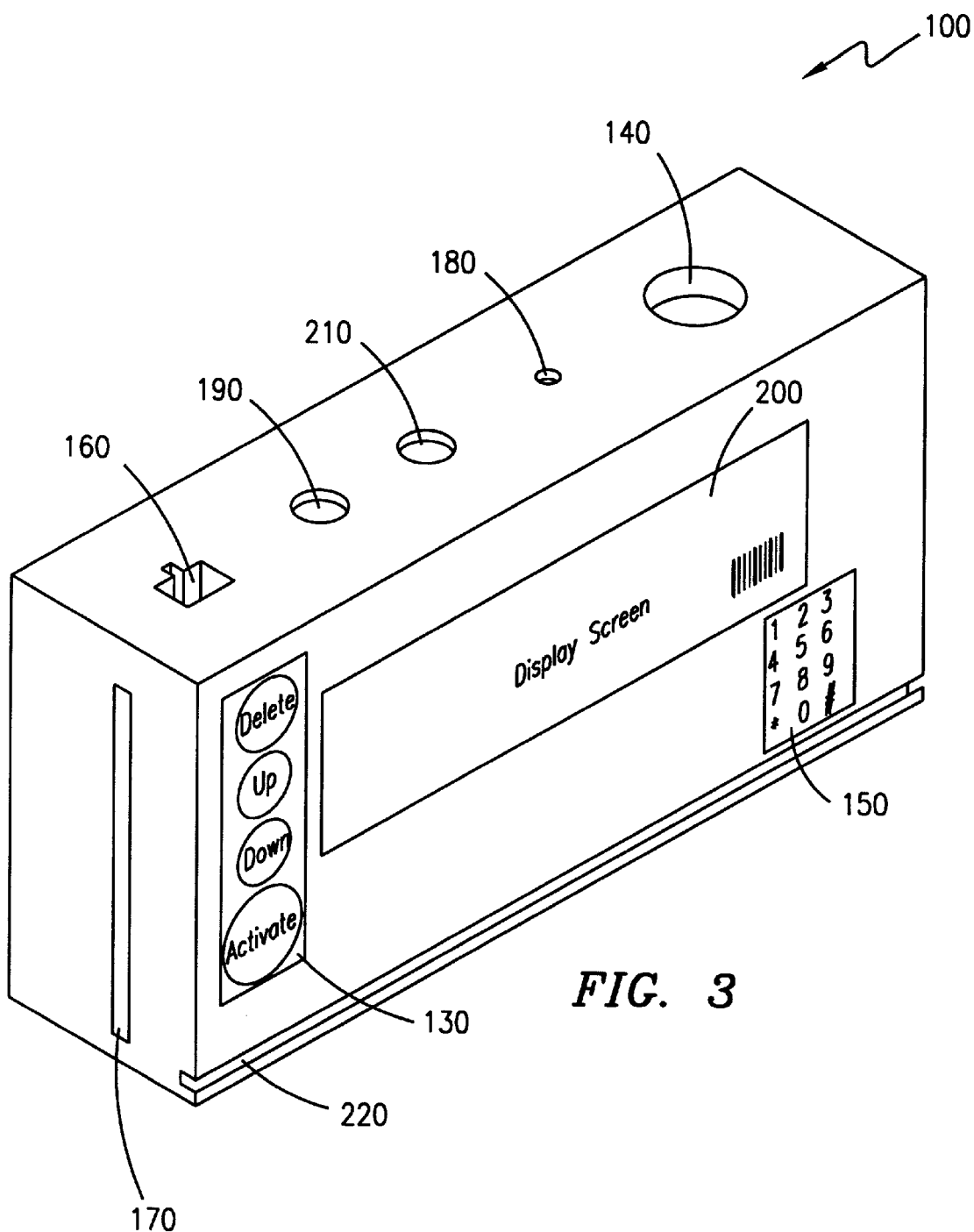
FIG. 3 is a perspective view of a wallet consolidator consistent with a preferred embodiment of the present invention.

Referring now to FIG. 3, there is illustrated a perspective view of a wallet consolidator 100. The wallet consolidator, shown generally at 100, includes the controller 110 which is located internally and not shown, the memory 120 also located internally and not shown, the user input cluster 130, the data interface 140, the keypad 150, the telephone interface 160, the smart card interface 170, the bar code scanner 180, the infrared transceiver 190, the display screen 200, the radio frequency transceiver 210 and the magnetic stripe reader/writer 220.

Although the preferred embodiments of the apparatus and method of the present invention have been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A wallet consolidator comprising:
   a controller for controlling operation of the wallet consolidator;
   a magnetic stripe reader/writer for reading and writing magnetic stripes wherein said reader/writer is contained within said consolidator;
   means for inputting user selections and commands;
   a memory for storing information provided to the wallet consolidator from a plurality of smart cards; and
   a smart card interface for effectuating communication between the wallet consolidator and a smart card such that a portion of the information stored in said memory can be written to a smart card.

2. The wallet consolidator, as recited in claim 1, wherein the means for inputting user selections and commands is a user input cluster.

3. The wallet consolidator, as recited in claim 1, wherein the means for inputting user selections and commands is a keypad.

4. The wallet consolidator, as recited in claim 1, further comprising a display screen for displaying text and graphics, the display screen further for displaying a bar code pattern capable of being scanned by a bar code reader.

5. The wallet consolidator, as recited in claim 4, wherein the display screen is a touch sensitive display screen further effectuating an input to the wallet consolidator.

6. The wallet consolidator, as recited in claim 1, further comprising a telephone interface for effectuating communication between the wallet consolidator and computing devices via a telephone network.

7. The wallet consolidator, as recited in claim 1, further comprising a data interface for effectuating communication between the wallet consolidator and computing devices.

8. The wallet consolidator, as recited in claim 7, wherein the data interface is effectuated using a serial data line.

9. The wallet consolidator, as recited in claim 7, wherein the data interface is effectuated using a parallel data line.

10. The wallet consolidator, as recited in claim 1, further comprising a bar code scanner for scanning bar codes.

11. The wallet consolidator, as recited in claim 1, further comprising a wireless communication interface.

12. The wallet consolidator, as recited in claim 11, wherein the wireless communication interface is effectuated using a radio frequency transceiver.

13. The wallet consolidator, as recited in claim 11, wherein the wireless communication interface is effectuated using an infrared transceiver.

14. A wallet consolidator comprising:
    a controller for controlling operation of the wallet consolidator;
    a magnetic stripe reader/writer for reading and writing magnetic stripes;
    a keypad for inputting user selections and commands;
    a memory for storing information provided to the wallet consolidator from a plurality of smart cards;
    a smart card interface for effectuating communication between the wallet consolidator and a smart card such that a portion of the information stored in said memory can be written to a smart card; and
    a display screen for displaying text and graphics, the display screen further for displaying a bar code pattern capable of being scanned by a bar code reader.

15. A method for warehousing information in a wallet consolidator comprising the steps of:
    reading information from magnetic stripes from a plurality of smart cards;
    storing the information obtained from a plurality of smart cards in a memory;
    selecting information, from among the stored information, to write to a magnetic stripe; and
    writing the selected information on a magnetic stripe.

16. The method, as recited in claim 15, wherein the step of storing the information in the memory comprises the step of storing the information in a smart card, and further wherein, the step of writing the selected information on the magnetic stripe further comprises the step of retrieving the information from the smart card.

17. The method, as recited in claim 15, further comprising the step of entering passcode information.

18. The method, as recited in claim 15, further comprising the steps of:
    scanning a bar code from a card;
    storing the scanned bar code;
    selecting a stored bar code; and
    displaying the selected bar code on a display screen for scanning by a bar code scanner.

19. The method, as recited in claim 15, further comprising the steps of:
    downloading information;
    storing the downloaded information;
    selecting stored information; and
    downloading the selected information.

* * * * *